US005801766A

United States Patent [19]

Alden

[11] Patent Number: 5,801,766

[45] Date of Patent: Sep. 1, 1998

[54] SECURITY SYSTEM FOR USE AT A ROULETTE TABLE

[75] Inventor: John Robin Alden, North Humberside, England

[73] Assignee: Aristocrat (Europe) Limited, London, England

[21] Appl. No.: 633,806

[22] PCT Filed: Oct. 19, 1994

[86] PCT No.: PCT/GB94/02282

§ 371 Date: Apr. 18, 1996

§ 102(e) Date: Apr. 18, 1996

[87] PCT Pub. No.: WO95/11067

PCT Pub. Date: Apr. 27, 1995

[30] Foreign Application Priority Data

| | | | |
|---|---|---|---|
| Oct. 19, 1993 | [GB] | United Kingdom | 9321501 |
| Sep. 23, 1994 | [GB] | United Kingdom | 9419208 |

[51] Int. Cl.$^{6}$ .......... H04N 7/18

[52] U.S. Cl. .......... 348/157; 348/155; 463/17; 463/22; 273/142 R

[58] Field of Search .......... 348/157, 143, 348/150, 151, 152, 153, 154, 155, 159, 441, 12, 373; 340/323 R; 463/22, 25, 16, 17, 29; 377/5; 273/142 R, 143 R, 142 B, 142 D, 142 E; H04N 7/18

[56] References Cited

U.S. PATENT DOCUMENTS

| | | | |
|---|---|---|---|
| Re. 34,340 | 8/1993 | Freeman | 348/12 |
| 3,810,627 | 5/1974 | Levy | 340/323 |
| 4,321,673 | 3/1982 | Hawwass et al. | 463/17 |
| 4,357,015 | 11/1982 | Santora et al. | 348/157 |
| 4,396,193 | 8/1983 | Reinhardt et al. | 463/17 |
| 4,643,425 | 2/1987 | Herzenberger | 463/17 |
| 4,989,873 | 2/1991 | Manabe | 273/142 B |
| 5,258,837 | 11/1993 | Gormley | 348/441 |
| 5,278,643 | 1/1994 | Takemoto et al. | 348/150 |

FOREIGN PATENT DOCUMENTS

| | | | |
|---|---|---|---|
| 0 194 388 A1 | 9/1986 | United Kingdom | A63F 5/00 |

*Primary Examiner*—Tommy P. Chin
*Assistant Examiner*—Y. Lee
*Attorney, Agent, or Firm*—Leydig, Voit & Mayer, Ltd.

[57] ABSTRACT

A security system for use at a gambling table capable of monitoring the gambling table, determining the end of each game played at the gambling table, detecting movement with a predefined area of the gambling table and indicating when movement occurs at or immediately after the end of each game.

19 Claims, 3 Drawing Sheets

SECURITY SYSTEM FOR USE AT A ROULETTE TABLE

FIELD OF A INVENTION

The present invention relates to a security system for use in gambling casinos and at gambling tables. More specifically the present invention relates to a security system for the game of roulette, although it should be noted that it can be adapted for use with other gambling games.

BACKGROUND OF THE INVENTION

The commonest form of cheating at a gambling table involves placing one's stake or increasing the size of one's initial stake after the outcome of a game is known. This usually involves pushing chips onto the winning number—known in the trade as "column pushing" or placing additional chips on top of existing chips—known in the industry as "top hatting".

Casinos are, of course, well aware of the possibility of cheating and already take measures to prevent this. Croupiers and dealers are expected to observe the players at their tables and the bets placed by them. However, at a busy table it is simply not possible to keep a watch on all of the players all of the time, and besides this cannot prevent cheating where the croupier and players are working in collusion with each other as sometimes happens. Table inspectors may mingle with the players to observe the play and in many casinos it is now common practice to have each of the tables monitored by a security camera the output of which is transmitted to a security room where casino staff look for any irregularities or cheating. The problem is that many cheats have become very adept and will not attempt to cheat whilst conscious of being observed. Furthermore, many cheats work in teams to divert the attention of those around a table whilst one of their number adds to or moves an existing bet, or places a new bet. Even the provision of security cameras has its limitations Although cameras allow security staff to see the layout of each table, they cannot always determine the exact moment when the outcome of a particular game at a particular table is known so as to be on the look out for any cheating.

SUMMARY AND OBJECTS OF THE INVENTION

GB0A02084830 discloses a camera system for monitoring a rotating roulette wheel and displaying the image on a television screen to the participants. Essentially it comprises a camera mounted above the roulette wheel and adapted to be rotated therewith, thereby providing a slow motion or still image of the roulette wheel. However, the camera system has no facility for automatically detecting attempts to cheat at the games.

It is an object of the present invention to provide a security system for use in casinos and at gambling tables which allows late bets, that is to say chips placed or moved after the betting has been closed, to be detected.

It is another object of the present invention to provide a security system for the game of roulette which is able to indicate remotely the progress of each game.

According to a first aspect of the present invention there is provided a security system for use at a roulette table comprising a video camera adapted in use to monitor the roulette wheel and the betting area of the roulette table, frame capture means, first frame comparator means for comparing successive video images of the roulette wheel to detect the relative position of the ball therein, processor means for determining when the speed of the ball around the roulette wheel has dropped below a predetermined threshold signifying the end of the game, second comparator means for comparing successive video images of the betting area of the roulette table to detect movement therein, and indicator means for indicating when any movement occurs in the betting area at or immediately after the end of the game.

According to a second aspect of the present invention there is provided a security system for use in casinos and at gambling tables comprising means for continuously monitoring the activity at a table, means for detecting the end of each game at the table, and means for detecting any movement over a predefined area of the table during and immediately after each game.

Conveniently, the monitoring means comprises one or more close circuit television cameras, each of which is adapted to provide a digitalised output of the images viewed thereby. The means for detecting the end of each game, and the means for detecting any movement over a predefined area of the table each take the form of frame sampling and comparison means. As will be appreciated by comparing data obtained from each frame output from the camera or cameras it is possible to follow the progress of a game and by the provision of suitable software routines determine when it has ended. It is also possible to detect the movement of a hand or, indeed, any other object, across the area of the table where stakes are placed, which might indicate an attempt at cheating.

Preferably indicator or warning means are provided to signify the end of a game and any movement in the betting area. Since cheating will not occur until the and of a game when the result is known by the players it is desirable to ensure that the warning means associated with movement detection is not initialised until the end of a game has been detected.

Preferably, recording/storage means are provided to make a record of the activity at a table. This allows casino staff to check whether there has been any cheating at a table if movement has been detected in the betting area at the end of a game. For convenience the recording/storage means holds a record of predetermined length, say ten seconds, and then dumps it. However, where movement is detected in the betting area the stored record covering the period in which that event occurred may be downloaded to further recording/storage means to be examined later.

BRIEF DESCRIPTION OF THE DRAWINGS

Embodiments of the present invention will now be described, by way of example, with reference to the accompanying drawings, in which.

DETAILED DESCRIPTION OF THE PREFERRED EMBODIMENT

Where the game to be played is roulette the security system in accordance with the present invention provides an indication of the progress of the game and also warns when late bets have been placed. It is useful to be able to monitor and indicate the progress of each game as this allows the winning number at a table to be displayed to players who are unsighted. It also allows the opening and closing of betting to be indicated.

In order to fulfil the operational objectives indicated hereinabove the security system must be able to recognise and indicate the following events during each game:

1. The dealer spinning the ball around the outer rim of the roulette wheel. This may be indicated on remote display means by the words "In Play" or "Ball In Play".
2. The moment when the ball is about to drop into a pocket on the roulette wheal. It is at this moment in time that players may attempt to cheat by placing late bets. Therefore by determining the moment of this event it is possible to recognise when the betting is closed and when late bets have been placed.
3. When the ball has actually dropped into a pocket on the roulette wheel and the identity of that pocket. This can then be displayed on the remote display means to indicate the outcome of a game.
4. When movement is occurring over that part of the table where bets are placed. If movement is detected after betting is closed, as determined by the ball dropping into a pocket it may be assumed that an attempt at cheating is being made and this matter can then be investigated by casino security staff.

Figure 1:
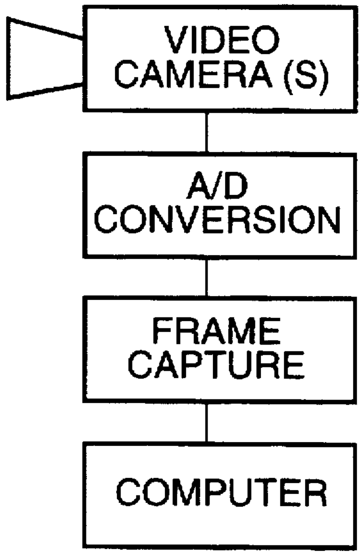
FIG. 1 is a block diagram of the basic hardware elements comrising the security system in accordance with the present invention.

Referring to FIG. 1 of the drawings the security system in accordance with the present invention essentially comprises a monochrome video camera which is so positioned as to be able to monitor both the roulette wheel and the betting area of the roulette table. Alternatively, two monochrome video cameras may be provided, one of which is positioned above the roulette wheel and the other one of which is positioned above the betting area of the roulette table. The or each camera is connected to an analogue to digital converter which converts the or each video output into a two dimensional array of numbers, where each number represents the relative brightness of the image viewed at a particular point.

As will be explained in greater detail hereinbelow the various stages of play of a game at the roulette table are detected by the security system by continuously comparing data obtained from the digitalised output of each camera using a frame capture or sampling card (well known within the field of video processing) and appropriate computer software. Changes in the data obtained from the video of the roulette wheel will, of course, indicate the position of the ball on the roulette wheel, whilst changes in the data obtained from the video of the betting area will indicate the placing of bets.

Figure 2:
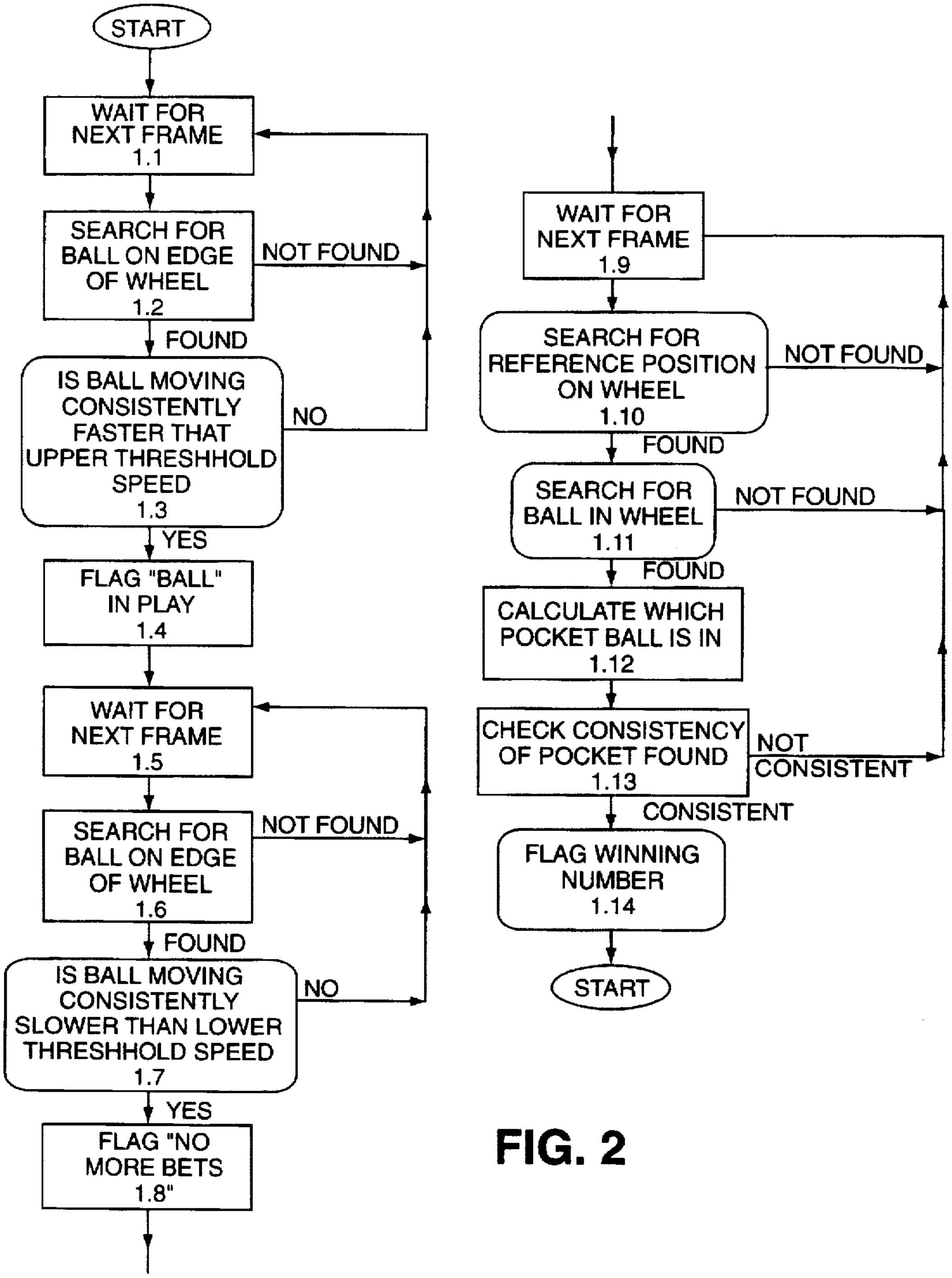
FIG. 2 is a flow chart showing how video of a roulette wheel is processed to determine when the outcome of a game is known and what that outcome is in a security system in accordance with the present invention; and, FIG. 3 is a flow chart showing how video of the betting area of a roulette table is processed to detect illegal movement therein in a security system in accordance with the present invention.

Referrig now to FIG. 2 of the accompanying drawings, the processing of the video of the roulette wheel will be described.

To determine the position of the ball as it spins around the outer rim of the roulette wheel the system considers only those parts of the video image along which the ball will be found; specifically a single pixel wide sample track that follows the path of the visible centre of the ball as it travels around the rim of the roulette wheel.

For each video frame from the camera (and there can be up to 25 per second) the system takes 256 brightness values equally spaced along the sample track followed by the ball around the rim of the wheel, and treats these values as a one dimensional array.

Each one dimensional array of data is filtered (to remove video noise) using a Finite Impulse Response (F.I.R.) filter of order 3 to perform local averaging.

After filtering, the one dimensional array for a given video frame from the camera is subtracted from the filtered array from the next video frame. The effect of this process is to make the system sensitive only to movement along the outer rim of the roulette wheel, and insensitive to shadows or stationary light and dark regions of the video image.

After subtraction of the arrays, any peaks (in brightness value) above a certain value are presumed to be caused by the ball in its progress about the rim. The position of the peak in the array indicates (to a first approximation) the position of the ball. Eg. if the peak is exactly half way through the array, then the ball may be found half way around the wheel (from the starting point of the one dimensional sample).

The calculated position of the ball is then corrected to allow for any perspective distortion caused by the camera not being directly over the roulette wheel.

Given a series of positions of the ball calculated in the above manner, and the exact times at which the ball was in those positions, the velocity and direction of the ball can be calculated.

If the system finds a series of 5 consecutive measurements that all indicate that the ball is travelling in the same direction at a speed greater than (say) 40 revolutions per minute, then the system determines that the ball has been spun around the rim by the dealer. At this stage "Ball In Play" can be flagged to the players.

If, after determining that the ball is in play, the system finds a series of two consecutive measurements that indicate that the ball is travelling at a speed lower than a certain threshold (say 32 rpm), then the system determines that the ball in about to descend into the inner part of the roulette wheel and will shortly drop into a pocket. At this stage "No More Bets" is flagged to the players.

Having determined that the ball has dropped into a pocket on the roulette wheel it is then necessary to identify that pocket. This operational objective is achieved by taking three sample tracks around the inner part of the wheal. As with the track around the outer rim of the roulette wheal each of these three sample tracks is one pixel wide and 256 brightness values, equally spaced around each sample track, are taken by the system.

The first such sample track is a ring that passes through that section of the roulette wheel that displays the numbers of the pockets. This section of the wheel is always coloured in a similar manner, namely 36 alternating segments of red and black and one segment of green. Since the system uses a monochrome video camera (which is inherently more sensitive to the red end of the visible spectrum) the red segments will appear as lighter areas (higher values in the array of brightness) while the black and green segments will appear darker.

The sample of 256 values is filtered using a high order F.I.R. filter to implement a narrow band pass filter centred at a spatial frequency of 18.5 cycles per revolution. This serves to filter out noise (including that caused by sampling through the numbers printed onto the wheel) and to accentuate the regular intervals of high and low areas that should appear in the array for the adjacent red and black coloured areas.

After filtering, the array is studied to determine the centres of all of the peaks (corresponding with areas of red) in the array. The distances between the peaks are calculated, and the number of peaks is checked to ensure that it is exactly 18. More or less than 18 peaks indicates that the noise level for this picture level is too great and that no further calculations should be performed on this picture.

The pair of peaks that are separated by the largest distance is taken to be the single place on the wheel where two red values are separated by two other segments, namely one black, and one green. Having determined the position of the green segment on the sample track the position of each numbered segment in the picture may then be determined.

All of these calculated positions are then corrected to allow for any perspective distortion caused by the camera not being directly over the roulette wheel.

The other two sample tracks are concentric rings passing through the pockets in the roulette wheels. The outer of these two rings follows the path traced by the visible centre of a ball in a pocket as the wheel is rotated and as such serves to detect the presence of the ball in a pocket. The inner of these two rings provides a reference signal to the system to avoid false or spurious recognition of the ball.

The processing of the data provided by these two sample tracks can be considered to have two stages. The first stage occurs during the period that the ball is spinning around the outer rim of the wheel. This is the only time during which the system may be sure that the ball is not in any of the pockets of the roulette wheel. During this period a running maximum is kept for each of the one dimensional arrays of data provided by the sample tracks. That is to say for each position in each of the two arrays, only the maximum value that occurs at that position is stored. The purpose of this is to record the brightest possible value that occurs at each position along the sample track when no ball is present.

The second stage occurs when the ball ceases to spin around the rim of the wheel and may, therefore, be presumed to be approaching or entering one of the packets. During this stage the data from each picture is sampled and the running maximum value from the previous phase is subtracted. Any positive brightness values that remain after this subtraction may be assumed to be due to the ball or to occasional specular reflections that may appear in the picture. The values from the inner sample ring are subtracted from the corresponding value of the outer sample ring; tending to cancel out the specular reflections without affecting the image of the ball. The data in the outer sample ring is then filtered with a high order F.I.R. filter to implement a band pass filter centred at a spatial frequency of 74 cycles per revolution. This serves to filter out any remaining noise while accentuating the image of the ball. Any peaks that remain over a certain level are considered to represent the ball. The position of the peak indicates the position of the ball on the image of the wheel. This position is then corrected to allow for any perspective effects caused by not having the camera directly above the wheel.

Having determined the position of the ball and the position of the green segment, the number of the pocket in which the ball rests can be found.

When the ball has been determined to have been in the same pocket for several pictures in a row, the ball is determined to have settled and the winning number can be flagged to the players.

Figure 3:
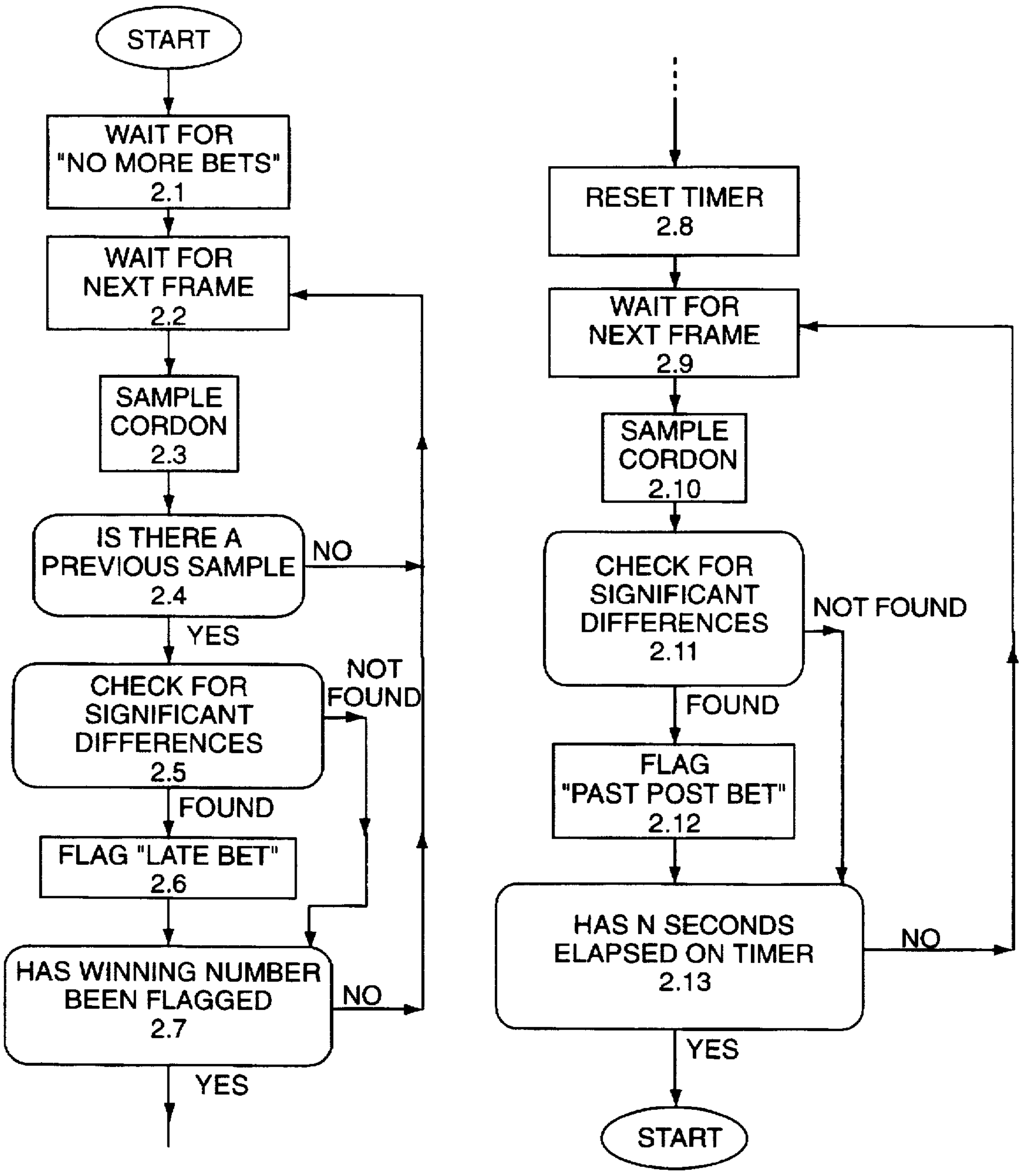

Referring now to FIG. 3, the processing of the video of the betting area to detect the placing of late bets will be described.

In a similar manner to that employed to monitor the roulette wheel, a series of one dimensional samples are taken from the digitalised video of the betting area. These samples define a cordon around the sides of the betting area where the players are seated.

The one dimensional array of data is filtered (to remove video noise) using a Finite Impulse Response F.I.R. filter of order 3 to perform local averaging.

After filtering, the one dimensional array for a given video frame is subtracted from the filtered array from the next video frame. The effect of this process is to make the system sensitive only to movement along the cordon, and insensitive to shadows or stationary light and dark regions of the video image.

After subtraction of the arrays, any peaks (in brightness value) above a certain value are presumed to be caused by betting chips or players arms passing through the cordon.

If movement in the betting area coincides with "No More Betting" as determined by the video camera monitoring the roulette wheel, an alarm can be sounded and security staff alerted.

Although the placement of the cordon around the betting area is entirely controlled by the user, the placement of the sample tracks on the roulette wheel is done within the operating software with a minimum of user intervention.

First the user lines up the camera over the roulette wheel so that the roulette wheel appears approximately in the centre of the video image. Then the system constructs a series of one dimensional straight sample lines that radiate from the centre of the video image.

The user then spins the roulette wheel slowly with no ball in it. The system then samples the data along these lines to construct a running maximum for each position. The user then places a ball into a pocket and spins the wheel again. The system now samples the data along these lines, subtracting the previously calculated running maxima. Any peaks that now remain are presumed to be the ball, and their positions on the picture are recorded. When several (four or more) position of the ball have been determined in this manner, the positions are substituted into the general equation of an ellipse to produce the formula of the ellipse that best fits those points. This ellipse then forms the outer ring which serves to detect the presences of a ball in a pocket. The formula of the inner ring is calculated by reducing the radii of the outer ring by a predetermined amount, whilst the formula of the ring that passes through the numbers is calculated by increasing the radii of the outer ring, again by a predetermined amount.

The formula for the ring following the outer rim of the roulette wheel is derived in a similar manner, only this time the user spins the ball around the edge of the roulette wheel instead of placing it in a pocket.

If required the images viewed by the cameras positioned above the roulette wheel and the betting area can be recorded so as to provide a record of events at the table which can be inspected by casino staff. Should movement across the cordon be detected after betting is closed, this visual record of the table can be inspected to see if there has been cheating or simply the innocent straying of someone's hand. Importantly all of this can be done without interrupting play at the table.

With card games such as Black Jack, Punto Banco, etc., the security system in accordance with the present invention operates in a similar way to that described above for roulette. However, rather than detecting when the ball has dropped into a number and whether there is any movement in the betting area after this event, the security system must determine when all the first cards are dealt, at which point betting is frozen, and store an image of the table layout at that time. When the final cards have been laid this would activate a comparison of the stored image with the real time image to verify that no intervening wagers, other than those allowable, have been made.

I claim:

1. A security system for use at a roulette table comprises a video camera adapted in use to monitor the roulette wheel and the betting area of the roulette table, frame capture means, first frame comparator means for comparing successive video images of the roulette wheel to detect the relative position of a ball therein, processor means for determining when the speed of the ball around the roulette wheel has dropped below a predetermined threshold signifying the end of a game, second comparator means for comparing successive video images of the betting area of the roulette table to detect movement therein, and indicator means for indicating when any movement occurs in the betting area at or immediately after the end of the game.

2. A security system according to claim 1, comprising means for detecting a reference point in the ring of pockets around the roulette wheel, means for detecting when the ball has come to rest in one of said pockets, means for detecting the identity of the pocket the ball has come to rest on from the position of that pocket relative to the reference point and display means for displaying the identity of the pocket.

3. A security system according to claim 1, comprising a digitizer for converting each video frame signal output from the video camera into a two dimensional array of numbers, where each number represents the relative brightness of the image at a particular point.

4. A security system according to claim 3, comprising means for selecting predefined data from each video frame corresponding to the ring of pockets in the roulette wheel for comparison by said first frame comparator means.

5. A security system according to claim 4, wherein said means for selecting predefined data from each video frame also selects data corresponding to the edge of the roulette wheel, and said security system further comprises a third comparator means for comparing said data over a succession of frames and display means for indicating that the ball is in play.

6. A security system according to claim 3, comprising means for selecting predefined data from each video frame corresponding to a cordon around the betting area of the roulette table such that changes in the data obtained signifies movement in the betting area.

7. A security system according to claim 1, comprising one video camera for monitoring the roulette wheel and another video camera for monitoring the betting area of the roulette table.

8. A security system according to claim 1 comprising video recording means for keeping a record of the video camera output.

9. A method for detecting cheating at a roulette table comprising the steps of:

a) monitoring the roulette wheel of said roulette table with a video camera;

b) processing each video frame obtained from the video camera so as to detect the presence of a ball on the roulette wheel;

c) comparing the information obtained from each video frame to determine the relative speed of rotation of the ball around the roulette wheel;

d) detecting when the speed of rotation has dropped below a predefined threshold signifying the end of a game;

e) processing each video frame obtained from the video camera to detect movement within the betting area of the roulette table;

f) indicating when movement within the betting area coincides with the end of the game.

10. A security system according to claim 2, comprising a digitizer for converting each video frame signal output from the video camera into a two dimensional array of numbers, where each number represents the relative brightness of the image at a particular point.

11. A security system according to claim 4, comprising means for selecting predefined data from each video frame corresponding to a cordon around the betting area of the roulette table such that changes in the data obtained signifies movement in the betting area.

12. A security system according to claim 5, comprising means for selecting predefined data from each video frame corresponding to a cordon around the betting area of the roulette table such that changes in the data obtained signifies movement in the betting area.

13. A security system according to claim 2, comprising one video camera for monitoring the roulette wheel and another video camera for monitoring the betting area of the roulette table.

14. A security system according to claim 3, comprising one video camera for monitoring the roulette wheel and another video camera for monitoring the betting area of the roulette table.

15. A security system according to claim 4, comprising one video camera for monitoring the roulette wheel and another video camera for monitoring the betting area of the roulette table.

16. A security system according to claim 5, comprising one video camera for monitoring the roulette wheel and another video camera for monitoring the betting area of the roulette table.

17. A security system according to claim 6, comprising one video camera for monitoring the roulette wheel and another video camera for monitoring the betting area of the roulette table.

18. A security system according to claim 2 comprising video recording means for keeping a record of the video camera output.

19. A security system according to claim 7 comprising video recording means for keeping a record of the video camera output.

* * * * *